United States Patent [19]

Takeuchi

[11] Patent Number: 4,989,709

[45] Date of Patent: Feb. 5, 1991

[54] DUSTPROOF MECHANISM FOR PULL-TYPE CLUTCH

[75] Inventor: Hiroshi Takeuchi, Neyagawa, Japan

[73] Assignee: Kabushiki Kaisha Daikin Seisakusho, Osaka, Japan

[21] Appl. No.: 481,005

[22] Filed: Feb. 12, 1990

[30] Foreign Application Priority Data

Feb. 17, 1989 [JP] Japan .................. 1-18277[U]

[51] Int. Cl.⁵ ...................... F16D 13/72; F16D 13/58
[52] U.S. Cl. ............................ 192/70.12; 192/70.27; 192/89 B; 192/113 A
[58] Field of Search ............ 192/70.12, 70.27, 113 A, 192/89 B

[56] References Cited

U.S. PATENT DOCUMENTS 4,655,334  4/1987  Valier ..................... 192/89 B
4,865,174  9/1989  Takeuchi ............... 192/113 A X Primary Examiner—Rodney H. Bonck
Attorney, Agent, or Firm—Armstrong, Nikaido, Marmelstein, Kubovcik, & Murray

[57] ABSTRACT

This invention relates to a dustproof mechanism for pull-type clutch having a diaphragm spring. An annular dustproof cover for covering a space is installed at a radial inside opened end of the space existing between a clutch cover end wall and the diaphragm spring, thus preventing dust etc. from entering the space between the diaphragm spring and the clutch cover end wall.

2 Claims, 2 Drawing Sheets

DUSTPROOF MECHANISM FOR PULL-TYPE CLUTCH

BACKGROUND OF THE INVENTION

1. Industrial useful field

This invention relates to a dustproof mechanism for a pull-type clutch.

2. Prior art

Generally, a pull-type clutch is so constructed that an outer peripheral fulcrum point $C1$ of a diaphragm spring 12 is supported by an end wall $2a$ of a clutch cover 2 located at a side opposite to a flywheel (rear side) through a wire ring 40 etc. for example, an intermediate fulcrum point $C2$ contacts with a fulcrum land $7a$ of a pressure plate 7. The clutch is released by pulling an inner peripheral fulcrum point $C3$ toward the side opposite to the flywheel as illustrated in FIG. 5.

In such a pull-type clutch, however, an opened space S is produced between the diaphragm spring 12 and the clutch cover end wall $2a$ so that dust and dirt will enter the space S during operation of the clutch. The dust and dirt entering the space S will gradually be crammed toward the radial outside fulcrum point $C1$ by centrifugal force to cause faulty operation of the diaphragm spring 12.

Object of the invention

An object of the invention is to prevent dust etc. from entering a space produced between a diaphragm spring and a clutch cover end wall so that faulty operation of the diaphragm spring can be avoided.

A further object of the invention is to form a dustproof cover by utilizing an air foil body for blowing cooling air to a pressure plate from outside, so that a number of component can be reduced and an assembly work can be simplified.

SUMMARY OF THE INVENTION

In order to accomplish the foregoing objects; the present invention provides a pull-type clutch including a clutch cover secured to a flywheel and having an inward end wall extending to a clutch axis side at an end opposite to the flywheel, a pressure plate freely movable in its axial direction, a clutch disc disposed between the pressure plate and the flywheel, a diaphragm spring an outer peripheral fulcrum point of which is supported by the end wall of the clutch cover and an intermediate fulcrum point of which mates with the pressure plate, and the clutch being released by pulling an inner peripheral end of the diaphragm spring to a side opposite to the flywheel; characterized by that a dustproof cover for covering a space is installed at an inside opened end of the space existing between the clutch cover end wall and the diaphragm spring.

In one embodiment of the the invention, an annular air foil body is secured to a side face of the diaphragm spring opposite to the flywheel, air scoops are formed on the air foil body at positions corresponding to openings of the diaphragm spring, and the annular dustproof cover is integrally formed on a radial outer peripheral end of the air foil body.

During rotation of the clutch, the space existing between the diaphragm spring and the clutch cover end wall is protected by the dustproof cover from intrusion of dust etc. Therefore, there is no chance for the dust etc. to clog in the vicinity of the outer peripheral fulcrum point of the diaphragm spring.

Further, in the one embodiment of the invention outside air is induced by the air foil body to the pressure plate during rotation of the clutch, and the pressure plate is cooled thereby. At the same time, dust etc. is prevented from entering the foregoing space by the dustproof cover formed integrally on the air foil.

BRIEF DESCRIPTION OF THE INVENTION

FIG. 1 is a vertical sectional view (section taken along a line I—I of FIG. 2) of a pull-type clutch according to claims 1 and 2 of this invention. FIG. 2 is a view viewed in a direction of arrow II of FIG. 1. FIG. 3 is a view viewed in a direction of arrow III—III of FIG. 2.

FIG. 4 is a vertical sectional view of another embodiment. FIG. 5 is a vertical sectional view of conventional clutch.

DETAILED DESCRIPTION OF THE INVENTION

Embodiment 1

Figure 1:
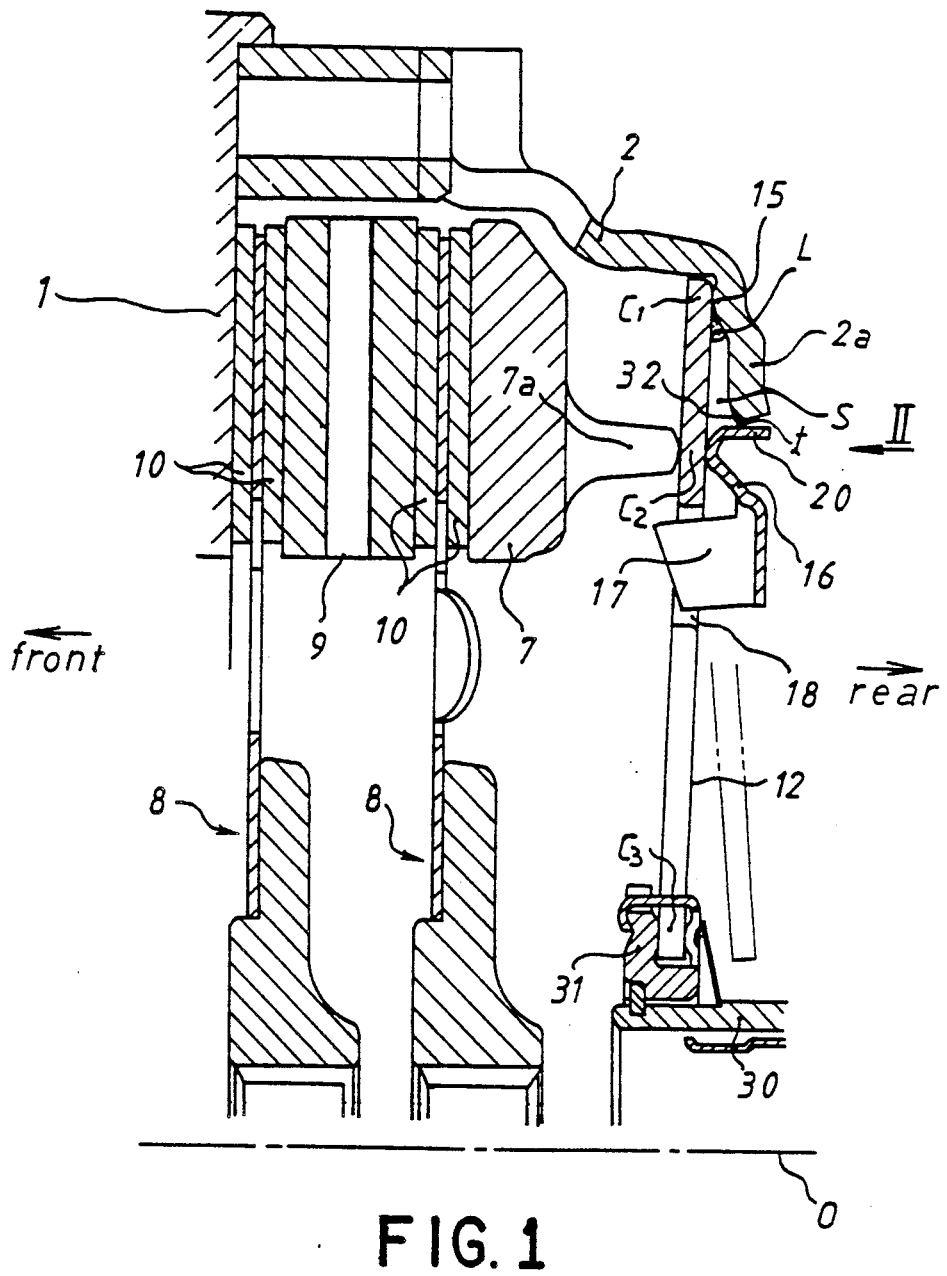
Figure 2:
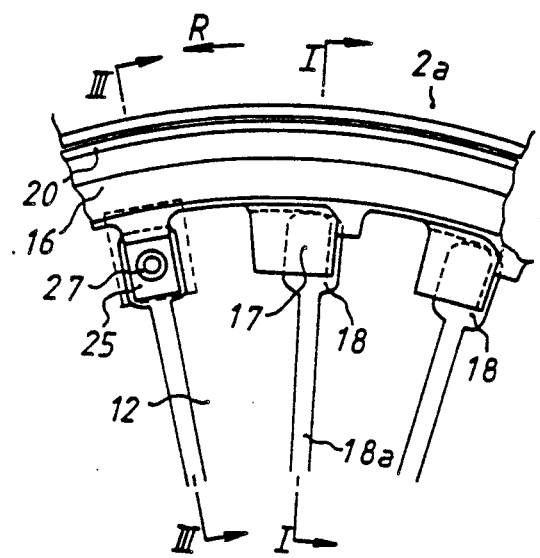
Figure 3:
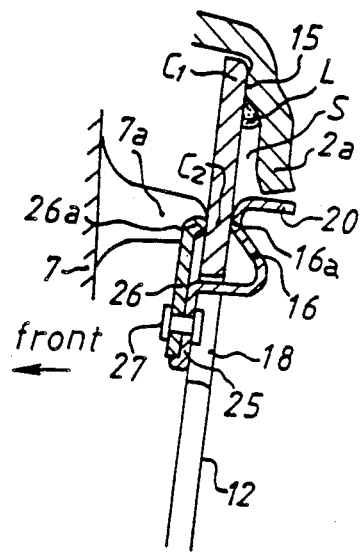
Figure 5:
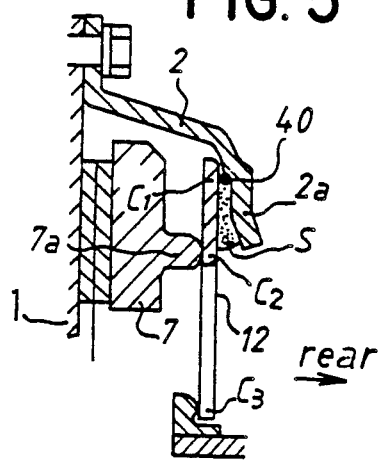

FIG. 1 through FIG. 3 show the pull-type clutch according to claims 1 and 2 of the invention. In FIG. 1 showing the vertical sectional view, a flywheel 1 is coupled to a crank shaft etc. and the flywheel side is assumed as a front side in axial direction. A clutch cover 2 is secured to a rear end face of the flywheel 1 and extends to a rear side (a side opposite to the flywheel), and an inward end wall $2a$ extending to radial inside is formed integrally on its rear end portion.

A pair of clutch discs 8, for example, are disposed at the rear side of the flywheel 1, the clutch discs 8 spline fit onto a clutch shaft (center line: 0) at their inner peripheral spline hubs, and facings 10 are provided on the clutch discs 8 at their outer peripheries. An intermediate pressure plate 9 is disposed between facings 10 of the both clutch discs 8, and a pressure plate 7 is disposed at rear side of them. The pressure plate 7 is supported by plural strap plates (not shown) to the clutch cover 2 in such a manner as movable in the axial direction.

A diaphragm spring 12 is disposed at the rear side of the pressure plate 7, and its outer peripheral fulcrum point $C1$ is supported by a forward-fronting annular projection 15 which is formed at a radial outside end portion of a clutch cover end wall $2a$. Thereby, a space S is inevitably produced between the diaphragm spring 12 and the clutch cover end wall $2a$. Grease L is filled around the annular projection 15 in the space S. An intermediate fulcrum point $C2$ of the diaphragm spring 12 contacts with a fulcrum land $7a$ of the pressure plate 7, and an inner peripheral fulcrum point $C3$ mates with a retainer 31 of a release sleeve 30. The foregoing fulcrum land $7a$ is formed at plural places with spaces left therebetween in circumferential direction.

In the pull-type clutch having the foregoing structure, an inner peripheral end of the diaphragm spring is pulled backward by pulling the release sleeve 30 backward so as to free a pressing force of the pressure plate 7 and thus release the clutch.

An annular air foil body 16 is movably secured to a rear face of the diaphragm spring 12, and this air foil body 16 integrally has air scoops 17 for inducing cooling air at places corresponding to several of plural openings 18 of the diaphragm spring 12.

An annular dustproof cover 20, which is an essential part of this invention, is formed integrally on a radial outside end portion of the foregoing annular air foil body 16. The dustproof cover 20 is made into a cylindrical shape, extended approximately in parallel with a clutch axis from the outside end portion of the air foil body 16 to the rear side so as to close a radial inside opened portion of the foregoing space S, and extended further to the rear side passing through a radial inside edge 32 of the clutch cover end wall 2a. A clearance t, which is small to such an extent that an axial movement of the dustproof cover 20 is not obstructed, is left between the dustproof cover 20 and the radial inside edge 32 of the end wall 2a.

FIG. 2 shows the view viewed in the direction of arrow II of FIG. 1, in which the diaphragm spring 12 has plural radial slits 18a, and the foregoing opening (so-called oval shaped opening) 18 is formed at outside end of each slit 18a. The air scoop 17 opens at its rotating direction R side end and radial inside end to draw in outside air by its rotation in the direction of arrow R, so that cooling air is blown to the front side pressure plate 7 (FIG. 1) through the openings of the diaphragm spring 12.

Connecting pieces 25 for securing the air foil body are integrally formed on portions of the air foil body 16 corresponding to the openings 18 in which the air scoops 17 are not located, and the air foil body 16 is secured to the diaphragm spring 12 by the connecting pieces 25 and plural washers 26 as shown in FIG. 3.

Namely, as seen from FIG. 3 showing one embodiment of a securing means for the air foil body 16, the connecting piece 25 extends through the opening 18 of the diaphragm spring 12 to the front side and connected by a rivet 27 to a rectangular washer 26 disposed in front of the diaphragm spring 12. The intermediate fulcrum point C2 of the diaphragm spring 12 is held by a tip bent portion 26a of the washer 26 and a forward-fronting annular projection 16a of the air foil body 16, so that deforming motion of the diaphragm spring 12 is not obstructed by the securing means.

Function will be described hereunder. During rotation of the clutch; the air foil body 16 of FIG. 2 rotates together with the diaphragm spring 12 in the direction of arrow R, draws in air from openings at rotation side of the air scoop 17, blows air to the front side pressure plate 7 of FIG. 1 through the openings 18, thus cooling the pressure plate 18.

The space S existing between the diaphragm spring 12 and the clutch cover end wall 2a is closed by the dustproof cover 20 so that there is no chance for dust and dirt to enter the space. Therefore, operation of the diaphragm spring 12 will not become faulty due to clogging of dust etc.

Further, the dustproof cover 20 also moves together with the diaphragm spring 12 in the axial direction when the clutch is released. However, the cover does not resist the elastic deforming motion of the diaphragm spring 12 because a small clearance t, which is small to such the extent that the axial movement of the dustproof cover 20 is not obstructed, is provided between the inner peripheral edge 32 of the clutch cover end wall 2a and the dustproof cover 20.

Embodiment 2

Figure 4:
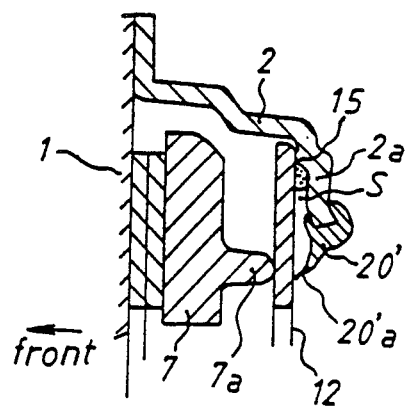

FIG. 4 is another embodiment of an annular dustproof cover (elastic seal) 20' made of elastic material such as rubber etc which is secured to a radial inside end of the clutch cover end wall 2a. The dustproof cover 20' made of elastic material extends to the front and radial inside so as to seal the inside opened end of the space S, and its tip end lip 20'a contacts with the rear face of the diaphragm spring 12.

EFFECT OF THE INVENTION

As described above, the pull-type clutch wherein the outer peripheral fulcrum point C1 of the diaphragm spring 12 is supported by the clutch cover end wall 2a and the clutch is released by pulling the inner peripheral fulcrum point C3 of the diaphragm spring 12 toward the side opposite to the flywheel, has the following advantages.

(1) The annular dustproof cover 20 (20') for covering the space is installed at the radial inside opened end of the space S existing between the clutch cover end wall 2a and the diaphragm spring 12. Therefore, dust and dirt are prevented from entering the foregoing space S so that the faulty operation of the diaphragm spring 12 due to clogging of dust etc. can be avoided when the clutch is released (2) Since dust etc. can be prevented from entering the space S, deterioration of grease L in the vicinity of the outer peripheral fulcrum point C1 of the diaphragm spring 12 can be avoided (3) Since the dustproof cover 20 is integrally formed on the air foil body 16 for inducing cooling air to the pressure plate 7, manpower for manufacture and assembly of the dustproof cover 20 can be saved.

What is claimed is:

1. In a pull-type clutch including a clutch cover having an axial end secured to a flywheel and having an inwardly directed end wall extending toward the clutch axis at an axial end opposite to said end secured to said flywheel, a pressure plate freely movable in its axial direction, a clutch disc disposed between said pressure plate and said flywheel, a diaphragm spring having an outer peripheral fulcrum point supported by an end wall of said clutch cover and an intermediate fulcrum point mating with the pressure plate, said clutch being released by pulling an inner peripheral end of said diaphragm spring axially away from the direction of said flywheel; a dustproof mechanism for said clutch comprising an annular dustproof cover covering a radial inside opened end of a space existing between said clutch cover end wall and said diaphragm spring.

2. A dustproof mechanism for the pull-type clutch as set forth in claim 1, in which said diaphragm spring has circumferentially spaced openings, an annular air foil body secured to a side face of said diaphragm spring facing away from said flywheel, air scoops on said air foil body at locations corresponding to said openings of said diaphragm spring, and an annular dustproof cover formed integrally on a radial outer peripheral end of said air foil body.

* * * * *